(12) United States Patent
Patwardhan et al.

(10) Patent No.: US 8,199,758 B2
(45) Date of Patent: Jun. 12, 2012

(54) VARIABLE ABORT TIMER

(75) Inventors: Ravindra M. Patwardhan, San Diego, CA (US); Anurag Vardhan, San Diego, CA (US); Parag A. Agashe, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 150 days.

(21) Appl. No.: 12/365,766

(22) Filed: Feb. 4, 2009

(65) Prior Publication Data

US 2009/0201818 A1 Aug. 13, 2009

Related U.S. Application Data

(60) Provisional application No. 61/028,501, filed on Feb. 13, 2008.

(51) Int. Cl.
*H04L 12/56* (2006.01)
*H04B 7/212* (2006.01)
*H04L 1/18* (2006.01)
(52) U.S. Cl. ............... 370/394; 370/442; 714/748
(58) Field of Classification Search .................. None
See application file for complete search history.

(56) References Cited

U.S. PATENT DOCUMENTS

| | | | | |
|---|---|---|---|---|
| 6,189,122 B1 * | 2/2001 | Cheng | ............... | 714/748 |
| 6,396,845 B1 * | 5/2002 | Sugita | ............... | 370/449 |
| 2001/0002910 A1 * | 6/2001 | Kikuchi | ............... | 370/468 |
| 2003/0012222 A1 * | 1/2003 | Rinchiuso | ............... | 370/468 |
| 2003/0179752 A1 * | 9/2003 | Grass | ............... | 370/394 |
| 2003/0181214 A1 * | 9/2003 | Grob et al. | ............... | 455/515 |
| 2005/0039101 A1 * | 2/2005 | Torsner | ............... | 714/748 |

(Continued)

FOREIGN PATENT DOCUMENTS

| | | |
|---|---|---|
| EP | 1583274 A1 | 10/2005 |
| KR | 100755269 B1 | 9/2007 |
| WO | WO03047155 | 6/2003 |

OTHER PUBLICATIONS

Emmelmann M Ed—Institute of Electrical and Electronics Engineers: "Effects of advertised receive buffer size and timer granularity on tcp performance over erroneous Links in a leo satellite network" GLOBECOM'02. 2002—IEEE Global Telecommunications Conference. Conference Proceedings. Taipei, Taiwan, Nov. 17-21, 2002; [IEEE Global Telecommunications Conference], New York, NY : IEEE, US, vol. 3, Nov. 17, 2002, pp. 2955-2958, XP010636287.
International Search Report and Written Opinion—PCT/US2009/033977, International Search Authority—European Patent Office—Aug. 10, 2009.

*Primary Examiner* — Clemence Han
(74) *Attorney, Agent, or Firm* — Florin Corie; Kam T. Tam

(57) ABSTRACT

Depending on channel conditions, a variable abort timer can be set in relation to wireless communication of data packets. Additionally, available buffer size can be evaluated and used to set a length of the variable abort timer. When a packet sequence is sent, packets can become lost in communication. When a lost packet is recognized, the timer can be initiated and a request for re-transmission of the lost packet can is sent. If the lost packet does not arrive during running of the variable abort timer, then the packet sequence can be processed without the missing packet.

48 Claims, 16 Drawing Sheets

U.S. PATENT DOCUMENTS

| | | | |
|---|---|---|---|
| 2005/0201339 A1* | 9/2005 | Mangin et al. | 370/337 |
| 2005/0281243 A1* | 12/2005 | Horn et al. | 370/345 |
| 2006/0133364 A1* | 6/2006 | Venkatsubra | 370/389 |
| 2006/0193276 A1* | 8/2006 | Sakata | 370/310 |
| 2006/0233150 A1* | 10/2006 | Cherian | 370/342 |
| 2006/0262757 A1* | 11/2006 | Baek | 370/336 |
| 2007/0168545 A1* | 7/2007 | Venkatsubra et al. | 709/236 |
| 2008/0209297 A1* | 8/2008 | Chandra et al. | 714/748 |

* cited by examiner

VARIABLE ABORT TIMER

CROSS-REFERENCE

This application claims priority to U.S. Application No. 61/028,501 entitled "Variable Abort Timer", which was filed on Feb. 13, 2008. The entirety of which is herein incorporated by reference.

BACKGROUND

1. Field

The following description relates generally to wireless communications and, more particularly, to managing multiple multimedia services, commonly in conjunction with a mobile device.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple (NT) transmit antennas and multiple (NR) receive antennas for data transmission. A MIMO channel formed by the NT transmit and NR receive antennas can be decomposed into NS independent channels, which can be referred to as spatial channels. Each of the NS independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one aspect, there can be a method operable upon a wireless communication device for managing an abort timer. The method can include setting a length for the variable abort timer, wherein the length defines a time duration to receive a missing data packet communicated on a channel. Additionally, the method can include evaluating a condition of the channel, wherein the channel is used in communication between a receiver and transmitter. Moreover, the method can include determining a change in the length for the variable abort timer based upon a result of the evaluation.

With another aspect, there can be an apparatus that configures with a modification module that sets a length for a variable abort timer, wherein the length defines a time duration to receive a missing data packet communicated on a channel. The apparatus can also configure with an analysis module that evaluates a condition of the channel, wherein the channel is used in communication between a receiver and transmitter as well as a calculator that determines a change in the length for the variable abort timer based upon a result of the evaluation.

In a further aspect, there can be at least one processor configured to manage an abort timer. The processor can use a first module for setting a length for the variable abort timer, wherein the length defines a time duration to receive a missing data packet communicated on a channel. The processor can additionally use a second module for evaluating a condition of the channel, wherein the channel is used in communication between a receiver and transmitter. Moreover, the processor can use a third module for determining a change in the length for the variable abort timer based upon a result of the evaluation.

In yet another aspect, there can be a computer program product with a computer-readable medium. The medium can include a first set of codes for causing a computer to set a length for a variable abort timer, wherein the length defines a time duration to receive a missing data packet communicated on a channel. The medium can also include a second set of codes for causing the computer to evaluate a condition of the channel, wherein the channel is used in communication between a receiver and transmitter. A third set of codes for causing the computer to determine a change in the length for the variable abort timer based upon a result of the evaluation can also be included with the medium Concerning one aspect, there can be an apparatus with means for setting a length for a variable abort timer, wherein the length defines a time duration to receive a missing data packet communicated on a channel as well as with means for evaluating a condition of the channel, wherein the channel is used in communication between a receiver and transmitter. The apparatus can also incorporate means for determining a change in the length for the variable abort timer based upon a result of the evaluation.

In accordance with one aspect, there can be a method for packet communication management operable upon a wireless communication device. The method can incorporate engaging in communication with a transmitter across a communication channel, wherein the communication includes transferring a packet set in a transmission sequence. Likewise, the method can also incorporate identifying that a packet is missing from the transmission sequence as well as starting an abort timer upon making the determination, wherein a duration of the abort timer is variable based upon a condition of the communication channel and the abort timer duration is a length of time for the missing packet to be collected as part of the transmission sequence.

With another aspect, there can be an apparatus with an emitter that engages in communication with a transmitter across a communication channel, wherein the communication includes transferring a packet set in a transmission sequence. The apparatus can also use a scanner that that identifies that a packet is missing from the transmission sequence. Additionally, the apparatus can use an initiation module that starts an abort timer upon making the determination, wherein a duration of the abort timer is variable based upon a condition of the communication channel and the abort timer duration is a length of time for the missing packet to be collected as part of the transmission sequence.

In a further aspect, there can be at least one processor configured to manage packet communication. The processor can include a first module for engaging in communication with a transmitter across a communication channel, wherein the communication includes transferring a packet set in a transmission sequence. Additionally, the processor can include a second module for identifying that a packet is missing from the transmission sequence. The processor can also include a third module starting an abort timer upon making the determination, wherein a duration of the abort timer is variable based upon a condition of the communication channel and the abort timer duration is a length of time for the missing packet to be collected as part of the transmission sequence.

In yet another aspect, there can be a computer program product with a computer-readable medium. The medium can include a first set of codes for causing a computer to engage in communication with a transmitter across a communication channel, wherein the communication includes transferring a packet set in a transmission sequence. The medium can also include a second set of codes for causing the computer to identify that a packet is missing from the transmission sequence. A third set of codes for causing the computer to start an abort timer upon making the determination, wherein a duration of the abort timer is variable based upon a condition of the communication channel and the abort timer duration is a length of time for the missing packet to be collected as part of the transmission sequence can also be used.

Concerning one aspect, an apparatus can implement with means for engaging in communication with a transmitter across a communication channel, wherein the communication includes transferring a packet set in a transmission sequence as well as means for identifying that a packet is missing from the transmission sequence. The apparatus can also implement with means for starting an abort timer upon making the determination, wherein a duration of the abort timer is variable based upon a condition of the communication channel and the abort timer duration is a length of time for the missing packet to be collected as part of the transmission sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

DETAILED DESCRIPTION

Figure 1:
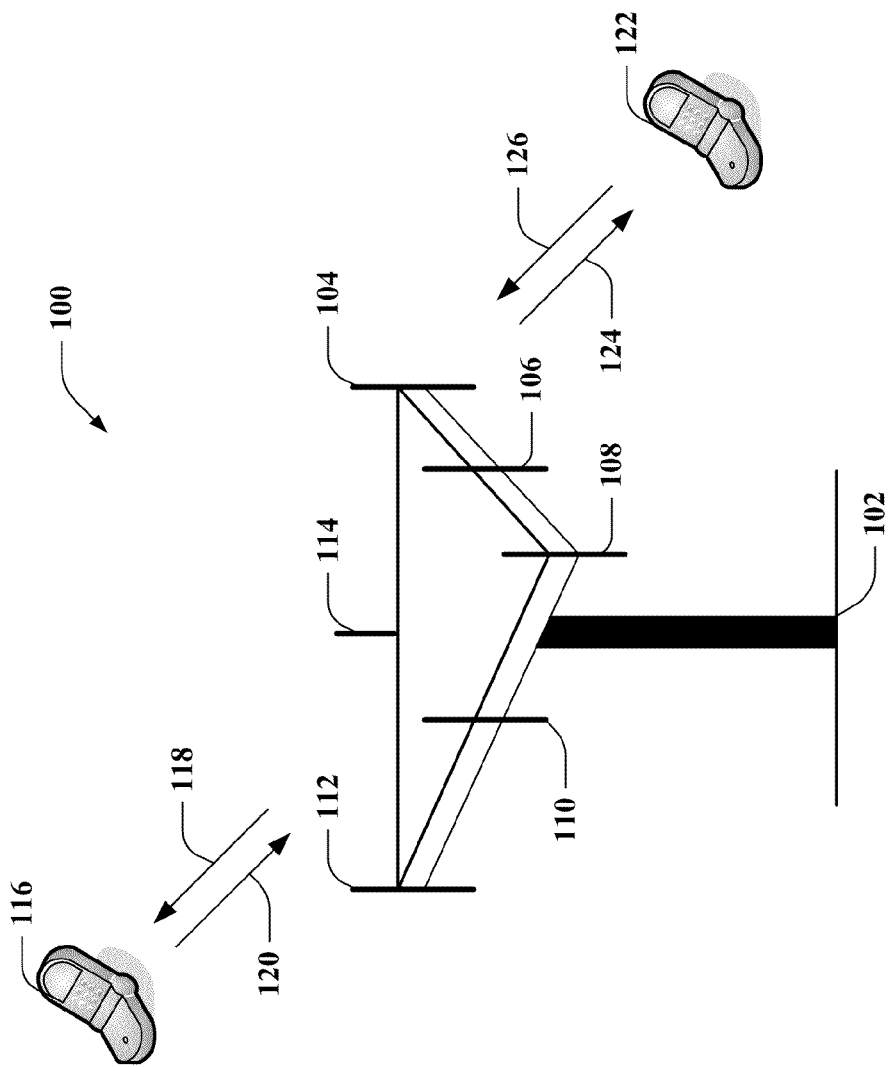
FIG. 1 is an illustration of a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more embodiments.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or cannot include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
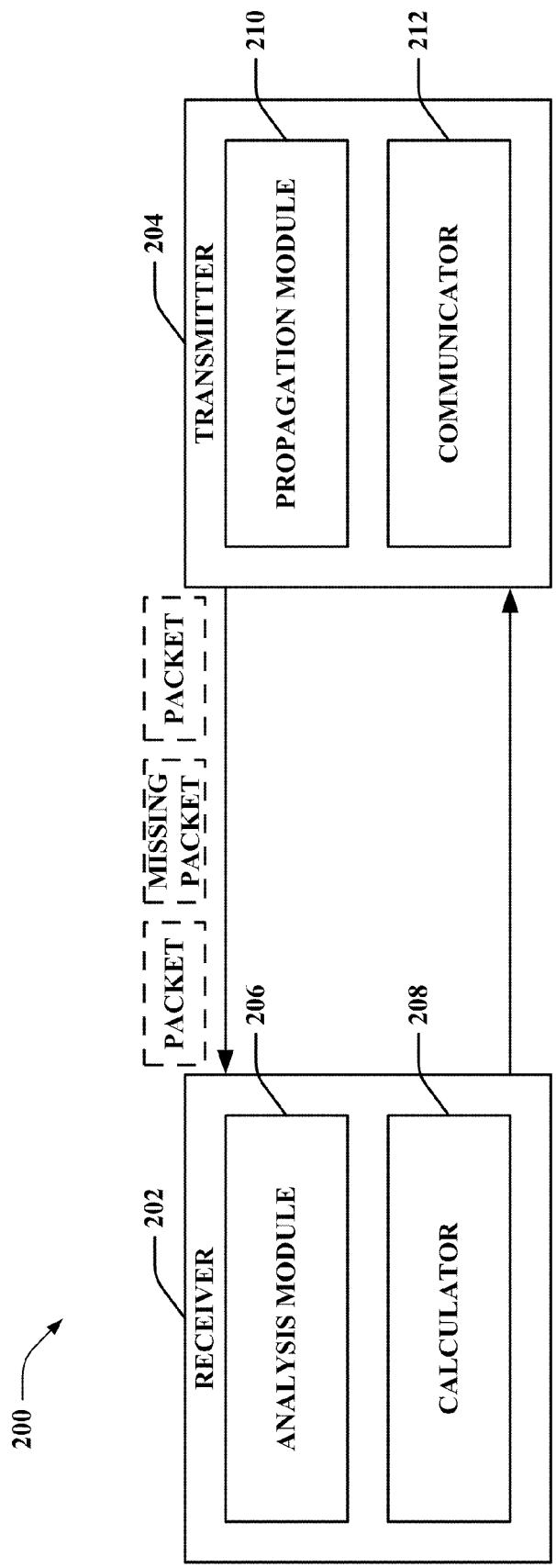
FIG. 2 is an illustration of an example system of a transmitter and receiver communicating information in accordance with at least one aspect disclosed herein.

Now referring to FIG. 2, an example system 200 is shown related to transferring of packets to a receiver 202 from a transmitter 204. A mobile device and base station can engage with communication with one another such that information packets transfer between the two. For instance, a mobile device (e.g., functioning as the transmitter 204) can transfer packets on an uplink to a base station (e.g., functioning as the receiver 202). Conversely, a base station (e.g., functioning as the transmitter 204) can transfer packets on a downlink to a mobile device (e.g., functioning as the receiver 202).

The transmitter 204 can identify a packet set (e.g., a group of packets that form a message) to communicate to the receiver 202. Upon identifying the packet set, there can be establishment of a communication link with the receiver 202 to facilitate packet transfer, such as across a dedicated shared channel (e.g. Common Control Channel (CCCH)). The transmitter 204 (e.g., through use of an antenna) can send packets in a particular sequence, where order information can be placed in a packet header.

The receiver 202 can collect packets from the transmitter 204, decode the header of the packets (e.g., decompress) and perform processing upon the message. An analysis module 206 can be used by the receiver 202 that evaluates channel condition (e.g., monitors the channel, makes estimation or inference based upon monitoring such as how much interference there is along the channel, etc.) related to communication between the receiver 202 and transmitter 204. It can be possible for a packet to be lost during a transmission and thus an abort timer can be used to determine how long the receiver 202 should wait before proceeding without the lost packet. Different characteristics can influence communication and therefore the abort timer can be variable in length such that the length of the timer can change based on contextual circumstances. For example, if there is low channel interference (e.g., determined by the analysis module 206), then the abort timer can be set to a lower value since a re-transmission of a packet should take less time. According to one embodiment, the value of the length is set to an estimate of time to re-transmit a packet n times, with n being a positive integer. A calculator 208 can be used that determines desirable a length of the abort timer based upon a result of the evaluation of the analysis module 206.

The transmitter can use a propagation module 210 to transfer packets sequentially. To facilitate engagement with the receiver 202, a communicator 212 can be employed that manages packet output. For instance, if a packet is lost, the receiver 202 can send a message to the transmitter 204 that is obtained by the propagation module 210 and interpreted by the communicator 212.

Figure 3:
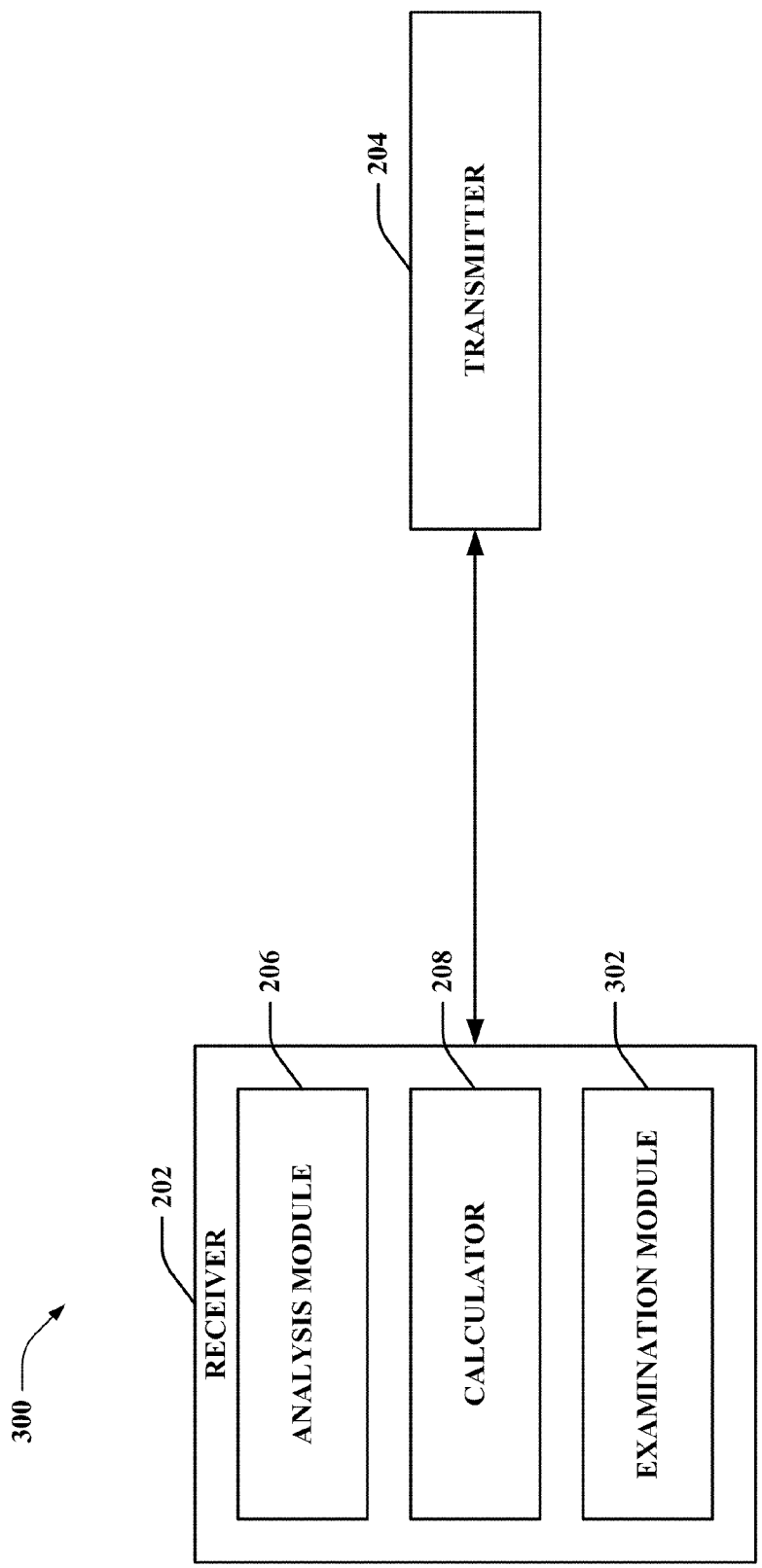
FIG. 3 is an illustration of an example system with a receiver configured to manage an abort timer for a lost packet in accordance with at least one aspect disclosed herein.

Now referring to FIG. 3, an example system 300 is shown for managing implementation of a variable abort header. A transmitter 204 can emit packets to a receiver 202 (e.g., with an analysis module 206 and calculator 208); however, it is possible for a packet to become lost and a variable abort timer to be used. Different factors (including channel quality) can be taken into consideration when setting a length for the variable abort timer.

An examination module 302 can be employed that analyzes a storage space characteristic for a buffer (e.g., a buffer of the receiver 202) and thus the storage space characteristic is used in determining the length. A device that implements as the receiver 202, such as a mobile device, can have a limited buffer size. As a packet transfers, a copy of the packet can retain in the buffer until an acknowledgement is received—then the packet is deleted from the buffer. When the receiver 202 collects packets and determines that there is a missing packet, the collected packets can be held in the buffer until the missing packet is resolved (e.g., collected, considered misplaced, etc.). Since buffer size can be at a premium, it can be advantageous to limit buffer use, so a shorter length for the variable abort timer can be provided (e.g., to allow the buffer to clear more quickly). Other factors that can be taken into account regarding setting the length, such as importance level of information in the packets, number of devices transmitting to the receiver 202, number of devices waiting to communicate with the receiver 202 (e.g., when the receiver 202 can communicate with one device at a time), etc.

The analysis module 206 can evaluate metadata pertaining transfer of the packet transmission sequence. The metadata can include why packets are transferred incorrectly, channel condition, a success rate of re-transmission requests, as well as other. The calculator 208 can determine if the length should be modified based at least in part on a result of the evaluation. For instance, if there is a relatively low success rate of re-transmission requests, then an inference can be drawn that a length of the variable time is not long enough and thus a change should occur. As such, the calculator 302 can determine a new length and modify the variable abort timer accordingly.

Figure 4:
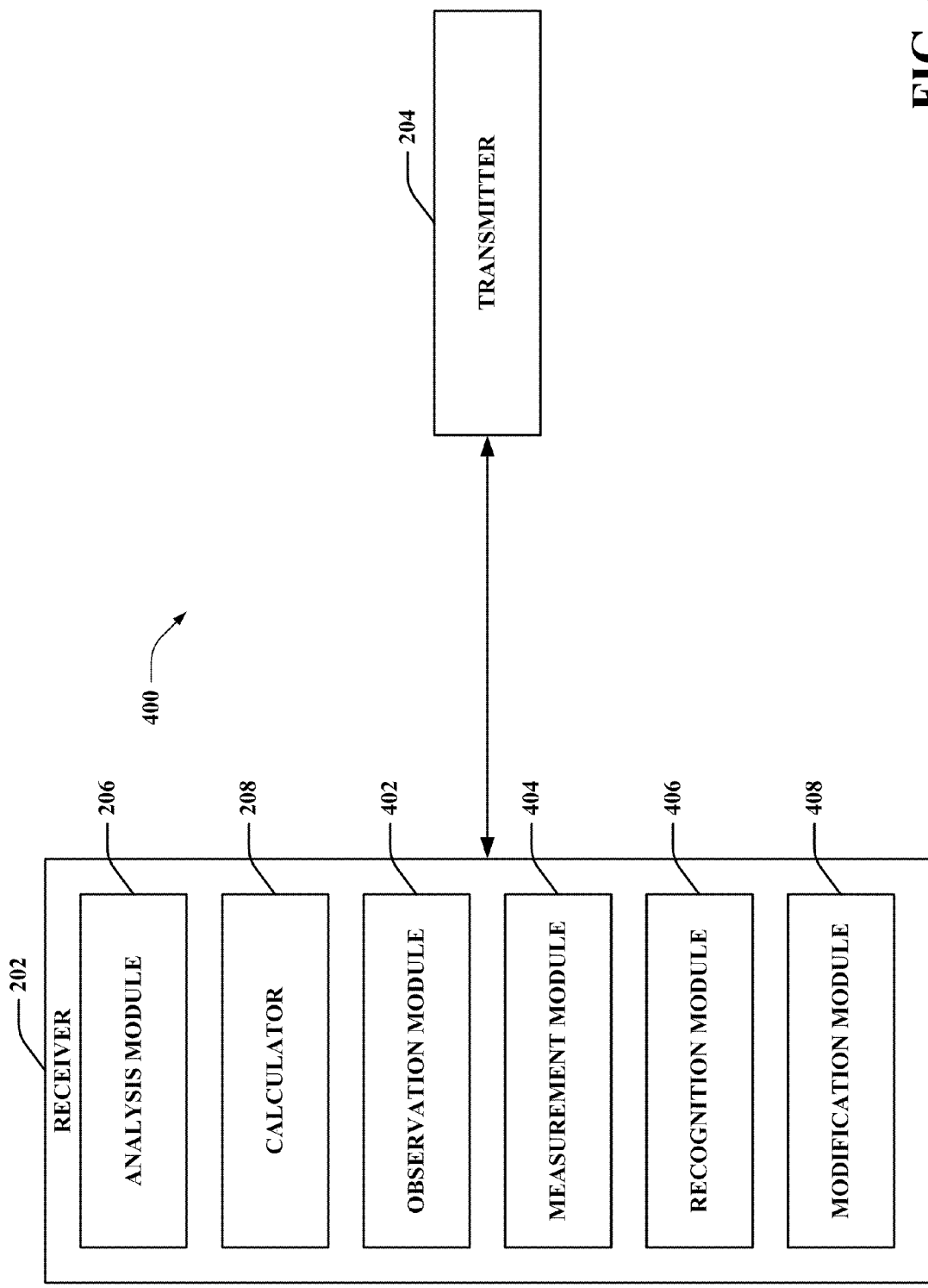
FIG. 4 is an illustration of an example system for modification of a variable timer in accordance with at least one aspect disclosed herein.

Now referring to FIG. 4, an example system 400 is shown for proactively monitoring communication to determine how to set a length for a variable abort timer (e.g., a clock used to determine when to stop waiting for a missing packet and process other packets). A receiver 202 (e.g., with analysis module 206 and calculator 208) can engage with a transmitter 204 to collect a message through a series of packets. However, as operation takes place, there can be a benefit to modifying the length—for instance, if a buffer is removed from the receiver 202, then there can be benefit in lowering the length.

An observation module 402 can be used to monitor communication between the receiver 202 and transmitter 204. In addition to monitoring the communication, contextual factors can be monitored as well, such as performance of the receiver 202 or transmitter 204, physical strain on devices (e.g., power usage), etc. In addition, a measurement module 404 can be employed that formulates (e.g., through employment of artificial intelligence techniques) if the length of the abort timer is appropriate based upon a result produced by the observation module 402.

Upon formulating that the length is not appropriate, a recognition module 406 can be employed that identifies a change for the length (e.g., a numerical change for the length). For instance, a look-up table can be employed to determine the change as well as employment of artificial intelligence techniques. A modification module 408 can implement the change; however, if there is no formulation that length is inappropriate, then the observation module 402 can continue functioning.

It is to be appreciated that artificial intelligence techniques can be used to practice determinations and inferences disclosed herein. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

Figure 5:
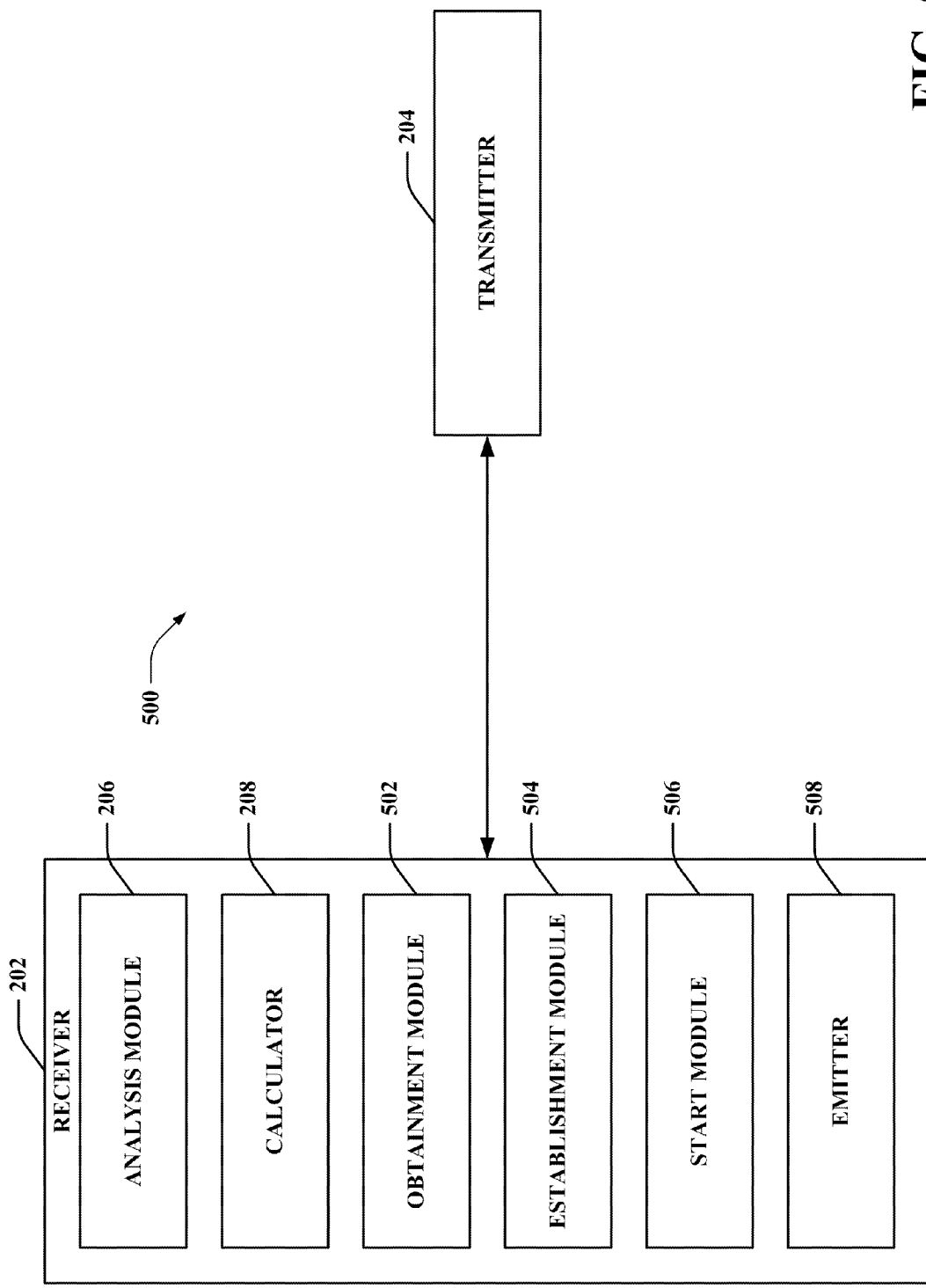
FIG. 5 is an illustration of an example system for operation of a variable abort timer in accordance with at least one aspect disclosed herein.

Referring to FIG. 5, an example system 500 is shown for having a receiver 202 (e.g., that includes an analysis module 206 and a calculator 208) that engages with a transmitter 204 for collection of a message through a series of packets. A request can be sent from the transmitter 204 requesting authorization to transfer the message—however, it is possible for the message to be sent without requesting authorization. The transmitter 204 can emit a packet set in a sequence (e.g., desired order of decoding) and an obtainment module 502 can collect a packet of the packet set.

An establishment module 504 can process the collected packets and identify that a packet of a packet set is not obtained through collection of a proceeding packet and a subsequent packet. For instance, the establishment module 504 can decode a header of a packet that includes a sequence number—if a packet with a number '1' is collected and next a packet with a sequence number '3', then an inference can be drawn that a packet with sequence number '2' is missing. A start module 506 can begin an abort timer that runs the set length while an emitter 508 sends a re-transmit request for the packet (e.g., the packet with sequence number '2') not collected. If the abort timer runs past the length, then the missing packet can be disregarded and further processing can take place.

Figure 6:
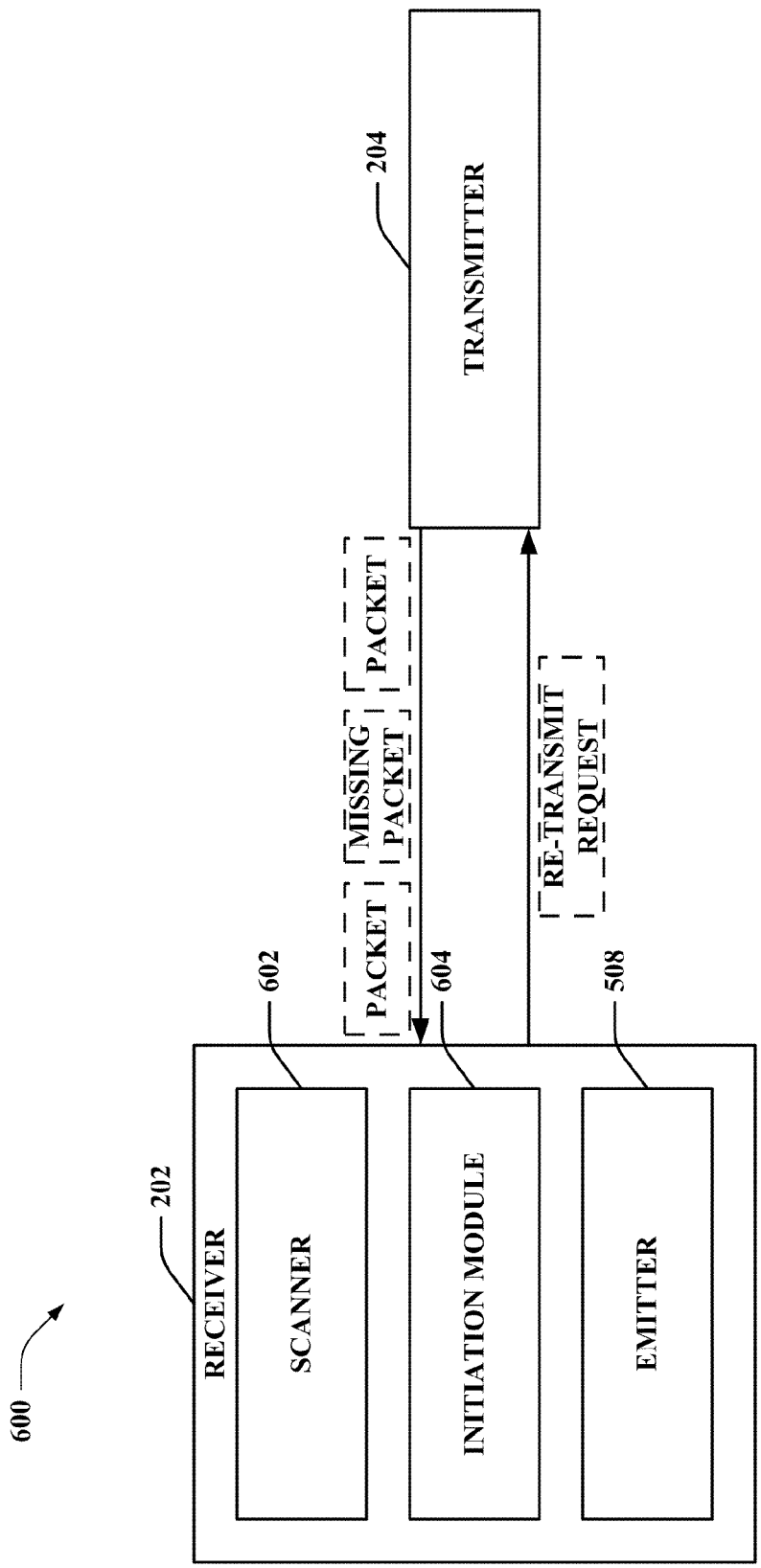
FIG. 6 is an illustration of an example system for using a variable abort timer when there is a packet failure in accordance with at least one aspect disclosed herein.

Referring now to FIG. 6, an example system 600 is disclosed for managing communication between a transmitter 204 and a receiver 202. Packets can transfer from the transmitter 204 to the receiver 202; however, packets can become lost during the transmission. A scanner 602 can be used that determines that a packet is missing from a packet transmission sequence.

An initiation module 604 can be use that starts an abort timer upon making the determination—the length of the abort timer is variable. A scan can be performed to identify a missing packet and an emitter 508 can transmit a request for the missing packet. In one implementation, the request is emitted simultaneously (e.g., within a tolerance) with starting the abort timer. In addition to sending the request, an evaluation can be performed to determine why a packet is missing (e.g., heavy interference, power failure of transmitter 204, etc.). Depending on an outcome of the evaluation, operation can be modified—for instance, if the packet is lost and the transmitter 204 fails, then the emitter 508 can be instructed not to operate since there is relatively little use in sending the request. While there can be a request for re-transmission, it is to be appreciated that a packet is not received because it is never sent, thus the re-transmission request can actually be a request to send a packet a first time in some instances.

Figure 7:
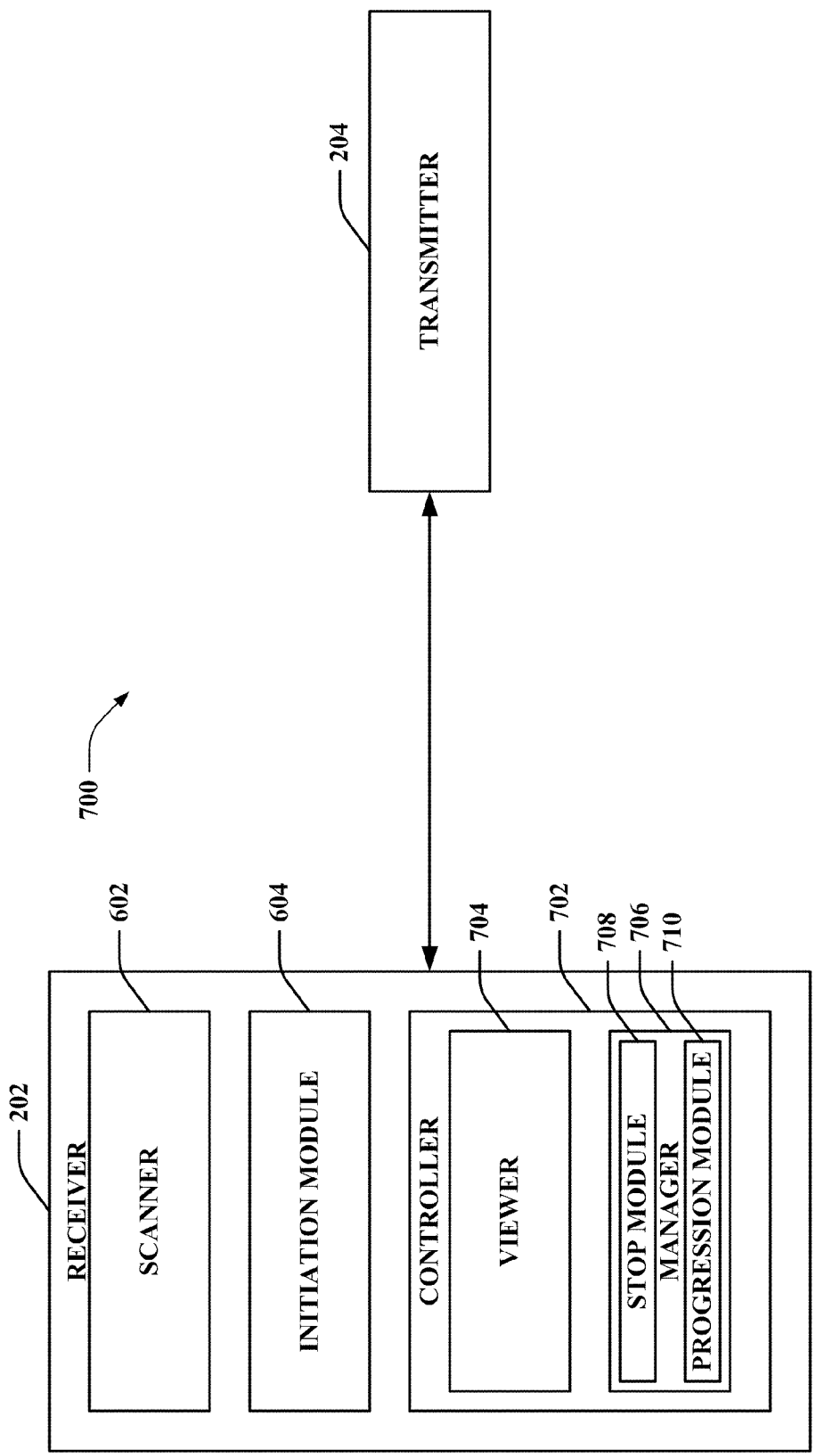
FIG. 7 is an illustration of an example system for operating when there is a missing packet in accordance with at least one aspect disclosed herein.

With FIG. 7, an example system 700 is shown for operating a variable abort timer in relation to a missing packet. The variable timer can be pre-set with a value; evaluations can be made and based upon a result of the evaluation, the value can be changed accordingly. A receiver 202 (e.g., with a scanner 602 and/or initiation module 604) can determine that a packet that is supposed to arrive, but has experienced a failure.

A controller 702 can be used to manage operation of the receiver 202 in relation to the variable abort timer. A viewer 704 monitors the abort timer and can identify that the abort timer ends—in an alternative configuration, the abort timer transmits a notice to the viewer that the end is reached. Once the timer ends, other operation can take place such that a manager 706 continues operation without the missing packet.

There can be at least two different outcomes to an abort timer ending. In one instance, a stop module 708 can be used that aborts the packet transmission sequence (e.g., a packet sequence that is supposed to include the missing packet). Therefore, the receiver 202 can process another sequence and notify the transmitter 204 of the abortion. In an alternative embodiment, a progression module 710 can process the packet transmission sequence without the missing packet. For example, assumptions can be made on contents of the missing packet (e.g., through artificial intelligence techniques). Also, if after the variable abort timer expires a packet is collected, then the receiver 202 can configure to process the missing packet and use the missing packet in sequence processing. If the missing packet is collected before the variable abort timer expires, then the controller 702 can reset the variable abort timer and instruct the receiver 202 to continue processing remaining packets.

Figure 8:
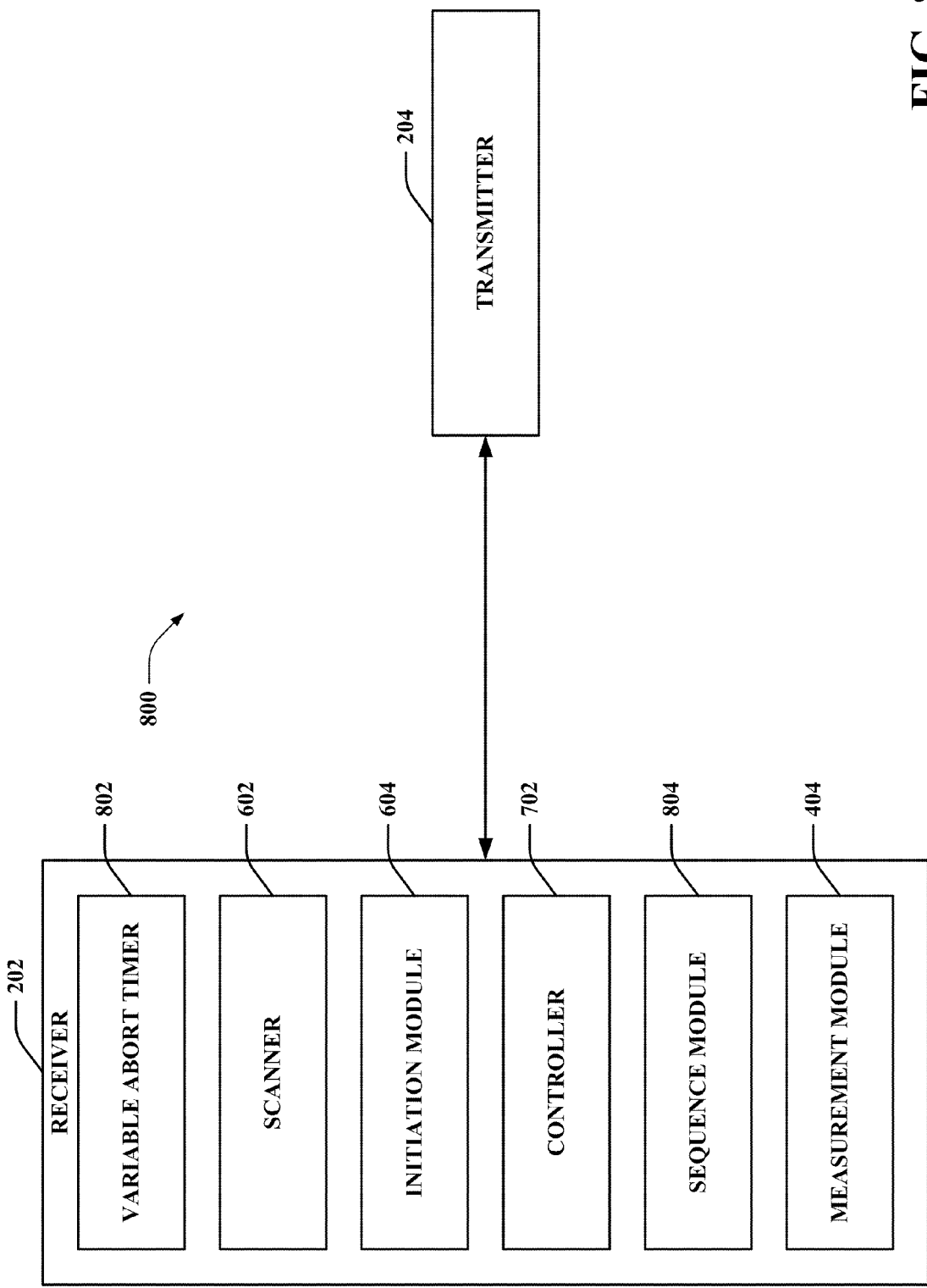
FIG. 8 is an illustration of an example system for proceeding with timed failure for packet communication in accordance with at least one aspect disclosed herein.

Now referring to FIG. 8, an example system 800 is shown for determining how to proceed with an expired abort timer (e.g., variable abort timer 802) and missing packet. A receiver 202 (e.g., with scanner 602 and/or initiation module 604) can engage with a transmitter 204 and a packet intended to reach the receiver 202 can fail to arrive. A controller 702 can be used to manage operation of the receiver 202 concerning packet transmission failures.

Once the abort timer ends, an inference can be drawn that the missing packet is lost and further actions should take place so the receiver 202 does not continuously wait for the missing packet. When the abort timer reaches a limit (e.g., the limit is set in a variable manner), a sequence module 804 can be used that evaluates at least a portion of the packet transmission sequence. For example, a determination can be made on a vitality level of the missing packet, if a sequence has more than one missing packet, etc. A measurement module 404 can use a result of the evaluation to determine if aborting or processing of the packet transmission sequence (e.g., collecting other packets, performing another action with the sequence, etc.) should occur. A determination made from the evaluation result is enacted (e.g., by the controller 702). Even while a packet is outstanding, the receiver 202 can continue to collect other packets, such as subsequent packets or packets from another sequence, from the transmitter 204 or other source.

Figure 9:
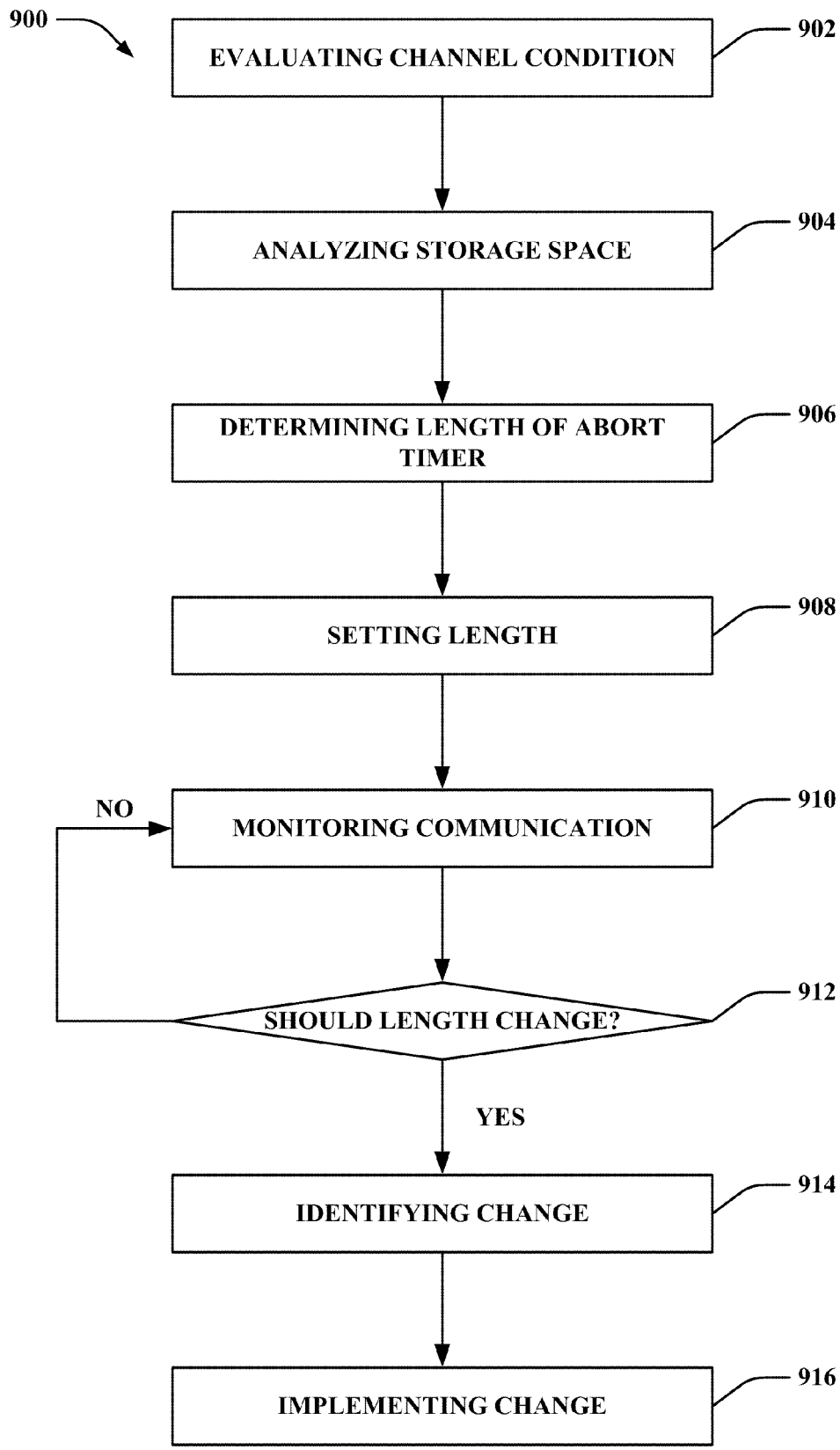
FIG. 9 is an illustration of an example methodology for processing an abort timer in accordance with at least one aspect disclosed herein.

Referring to FIG. 9, an example methodology 900 is disclosed for managing a length for a variable abort timer. A channel condition used for device communication (e.g., from a base station to a mobile device) can be observed and evaluated at action 902 which can include evaluating a condition of a channel (e.g., the channel is used in communication between a receiver and transmitter). Additionally, storage space can be analyzed at event 904—specifically storage space that can be used to retain packets. For example, if there is a missing packet, then other packets (e.g., subsequent packets) can be retained in the storage space while the variable abort timer runs and there is an attempt to gain the missing packet. A length for the variable abort timer can be determined at act 906 (e.g., based upon a result of the evaluation and analysis) including determining a change in the length for the variable abort timer based upon a result of the evaluation and a length for the variable abort timer can be set at action 908.

With the length set, communication across the channel can be monitored at event 910 as well as observation made regarding the storage space. Also, there can be monitoring of communication, such as if a transmitter is having difficulties sending repeated packets (e.g., packet re-transmissions are taking a longer than expected time). A determination can be made at check 912 on if the length of the abort timer should change (e.g., extended, contracted . . . ). If it is determined that the length should not change, the methodology 900 can return to event 910. However, if it is determined that change should occur, then a change can be identified at act 914 (e.g., a value to set the length at, how to change the length, a deviation for the current length, etc.) and the identified change can be implemented at action 916 which can include setting a length for the variable abort timer—the length defines a time duration to receive a missing data packet communicated on a channel.

Figure 10:
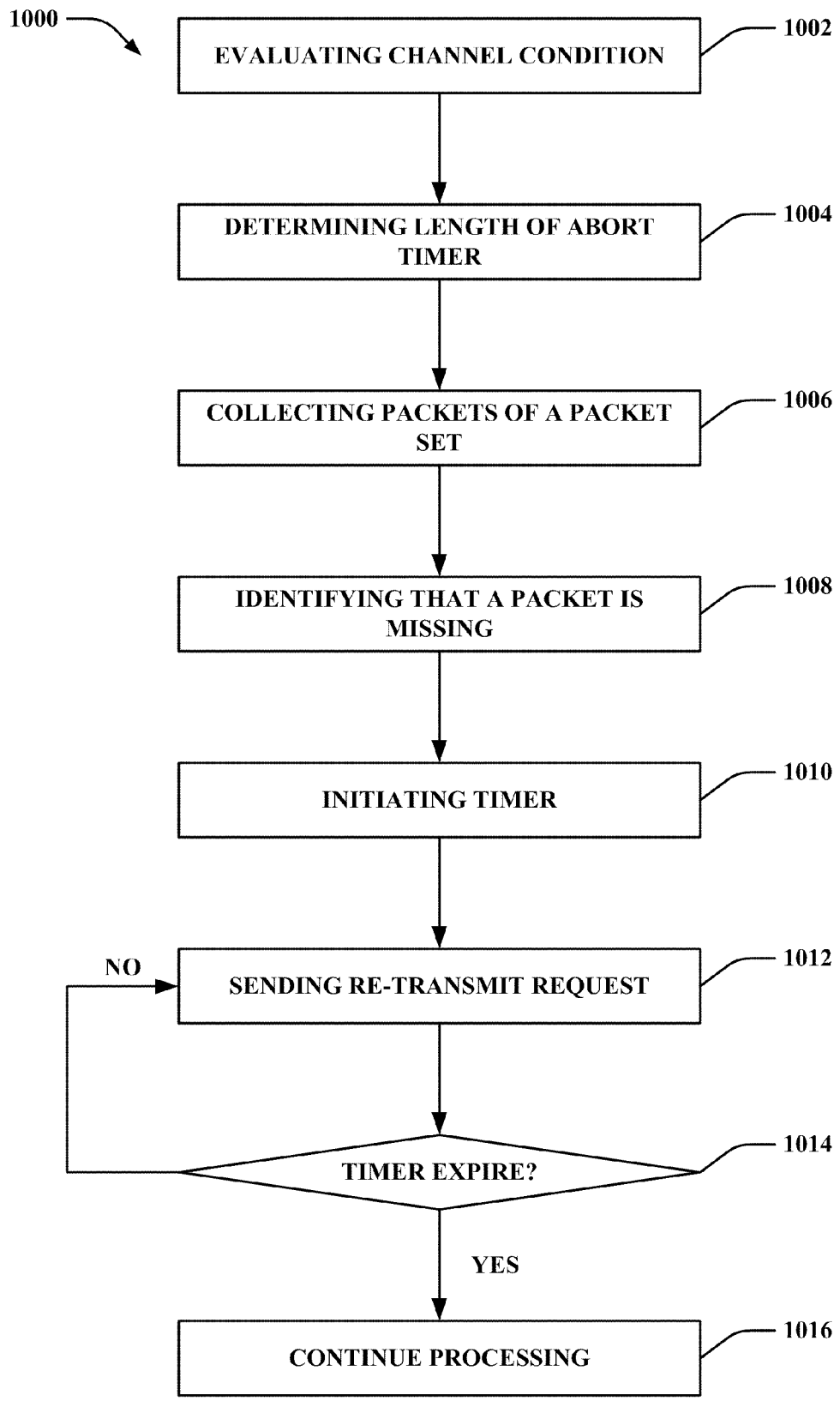
FIG. 10 is an illustration of an example methodology for engaging a variable abort timer in accordance with at least one aspect disclosed herein.

Concerning FIG. 10, an example methodology 1000 is disclosed for managing packet communication regarding a variable abort timer. A channel condition can be evaluated at event 1002 and a determination can be made at action 1004 on how long to set the timer. A transmitter can emit a packet set though packets in a serial manner and these packets can be collected at event 1006 which can include engaging in communication with a transmitter across a communication channel, wherein the communication includes transferring a packet set in a transmission sequence.

As packets are collected, identification can be made at action 1008 that a packet is missing from the transmission sequence. Once the missing packet is identified, the variable abort timer can be initiated at event 1010—this can include starting an abort timer upon making the determination (e.g., a duration of the abort timer is variable based upon a condition of the communication channel and the abort timer duration is a length of time for the missing packet to be collected as part of the transmission sequence). A re-transmission request can be transferred at event 1012 (e.g., occurs simultaneously with event 1010, before event 1010, after event 1010 . . . ). A check 1014 can occur to determine if the variable abort timer expires. If it is determined that the timer is not expired, then another re-transmit request can be sent. In one embodiment, a determination can be made if a long enough time passes between requests for a packet to be re-transmitted, collected, and/or processed—if enough time does not pass, then a delay can be used. However, if the timer does expire, then the packet set can be processed without the missing packet.

Figure 11:
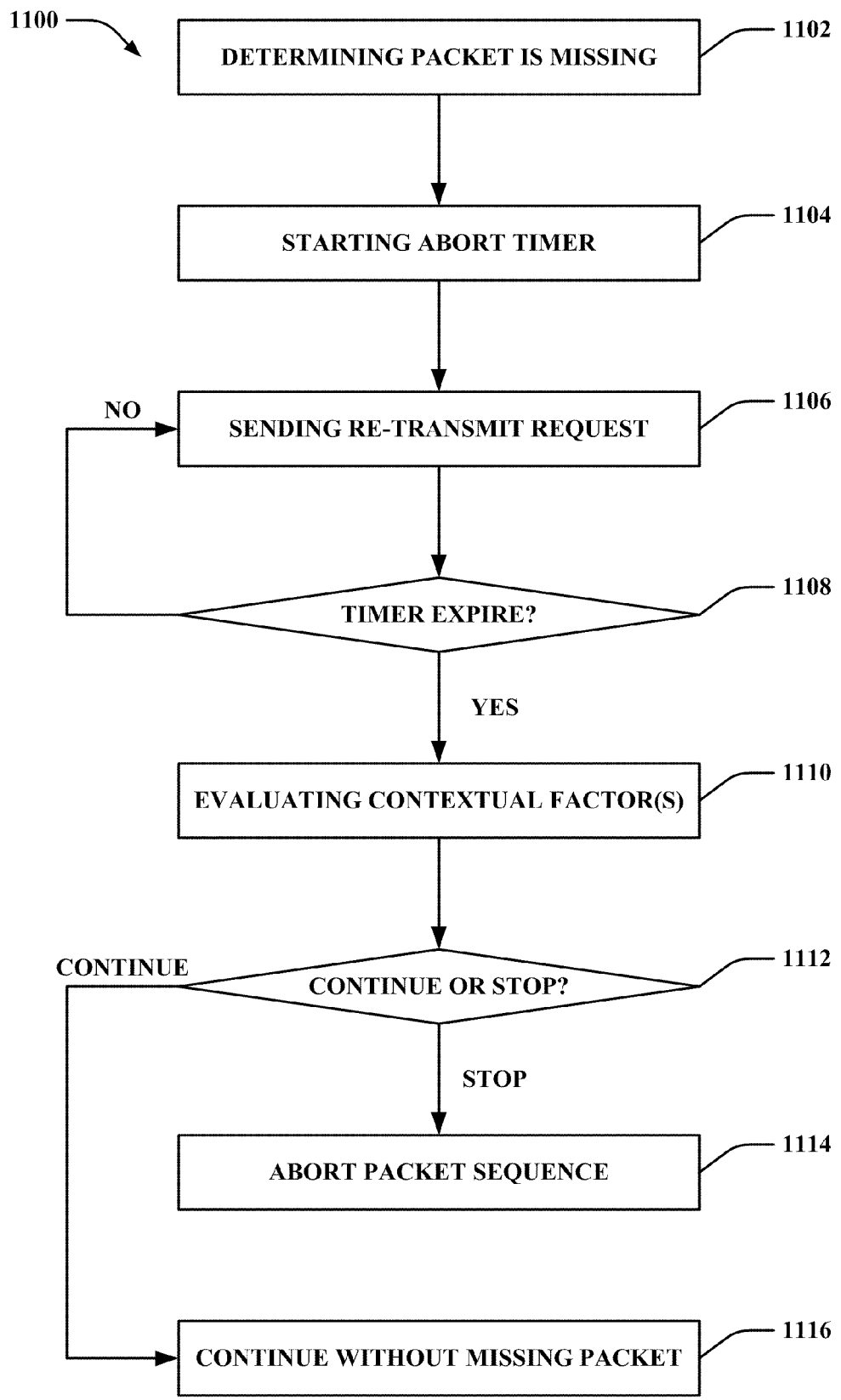
FIG. 11 is an illustration of an example methodology for processing a packet transfer failure in accordance with at least one aspect disclosed herein.

Now referring to FIG. 11, an example methodology 1100 is disclosed for performing operation regarding a packet considered missing and lost. A determination can be made at event 1102 that a packet is missing from a communicated message. For example, if a packet with a sequence number of '2' is collected, then an inference can be drawn that a missing packet exits (e.g., a packet with a sequence number of '1'). When the determination is made that a packet is missing, a variable abort timer can be started at act 1104.

A request for re-transmission of a missing packet can take place at act 1106 and a check 1108 can occur determining if the timer that started at act 1104 expires. If the timer does not yet expire, then the methodology 1100 can return to act 1106; however, if the timer reaches expiration, then there can be evaluation of at least one contextual factor (e.g., receiver wait time, message critical level, etc.) at event 1110. A check 1112 can determine if a message associated with the packet should be discarded (e.g., thus aborting a packet sequence at act 1114) or if the message should be processed without the missing packet (e.g., thus continuing without the missing packet at event 1116). While aspects disclosed herein relate to variable abort timers, it is to be appreciated that aspects can be practiced regarding a non-variable abort timer.

Referring to FIGS. 9-11, methodologies relating to use of a variable abort timer. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding how to set a variable abort timer, if length of the timer should be changed, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining communicating with a transmitter. By way of further illustration, an inference can be made related to if a packet is lost, channel conditions, and the like It will be appreciated that the foregoing examples are illustrative in nature and are not intended to limit the number of inferences that can be made or the manner in which such inferences are made in conjunction with the various embodiments and/or methods described herein.

Figure 12:
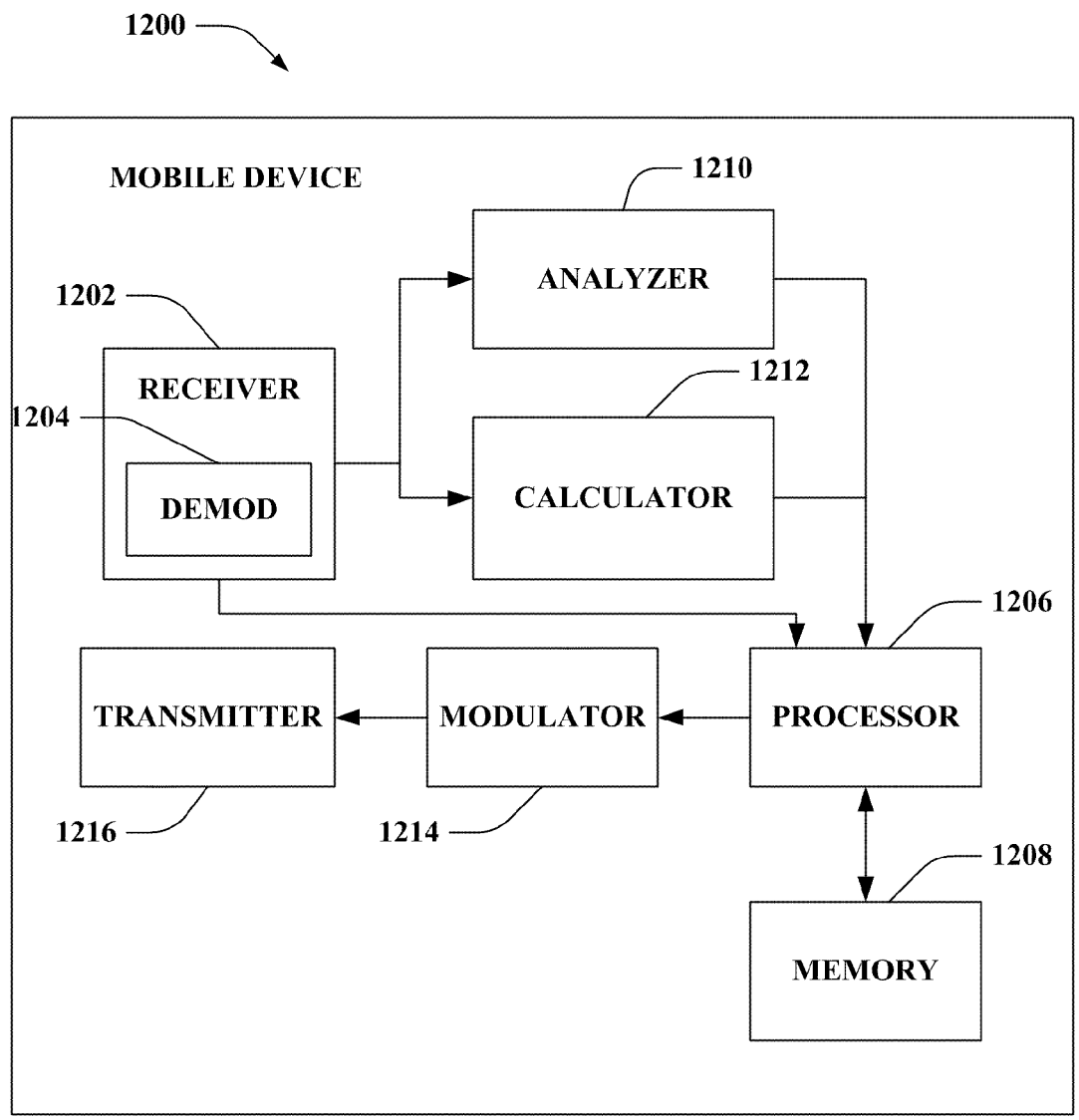
FIG. 12 is an illustration of an example mobile device that facilitates use of a variable abort timer in accordance with at least one aspect disclosed herein.

FIG. 12 is an illustration of a mobile device 1200 that facilitates management of a variable abort timer. Mobile device 1200 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1216, a processor that controls one or more components of mobile device 1200, and/or a processor that both analyzes information received by receiver

1202, generates information for transmission by transmitter 1216, and controls one or more components of mobile device 1200.

Mobile device 1200 can additionally comprise memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Processor 1202 is further operatively coupled to an analysis module 1210 that that evaluates channel condition, such as a channel shared between a mobile device (e.g., mobile device 1200) and a base station. Moreover, the processor 1202 can include a calculator 1212 that determines a length of the abort timer based upon a result of the evaluation. Mobile device 1200 still further comprises a modulator 1214 and a transmitter 1216 that transmits a signal (e.g., base CQI and differential CQI) to, for instance, a base station, another mobile device, etc. Although depicted as being separate from the processor 1206, it is to be appreciated that the analysis module 1210 and/or calculator 1212 can be part of processor 1206 or a number of processors (not shown).

Figure 13:
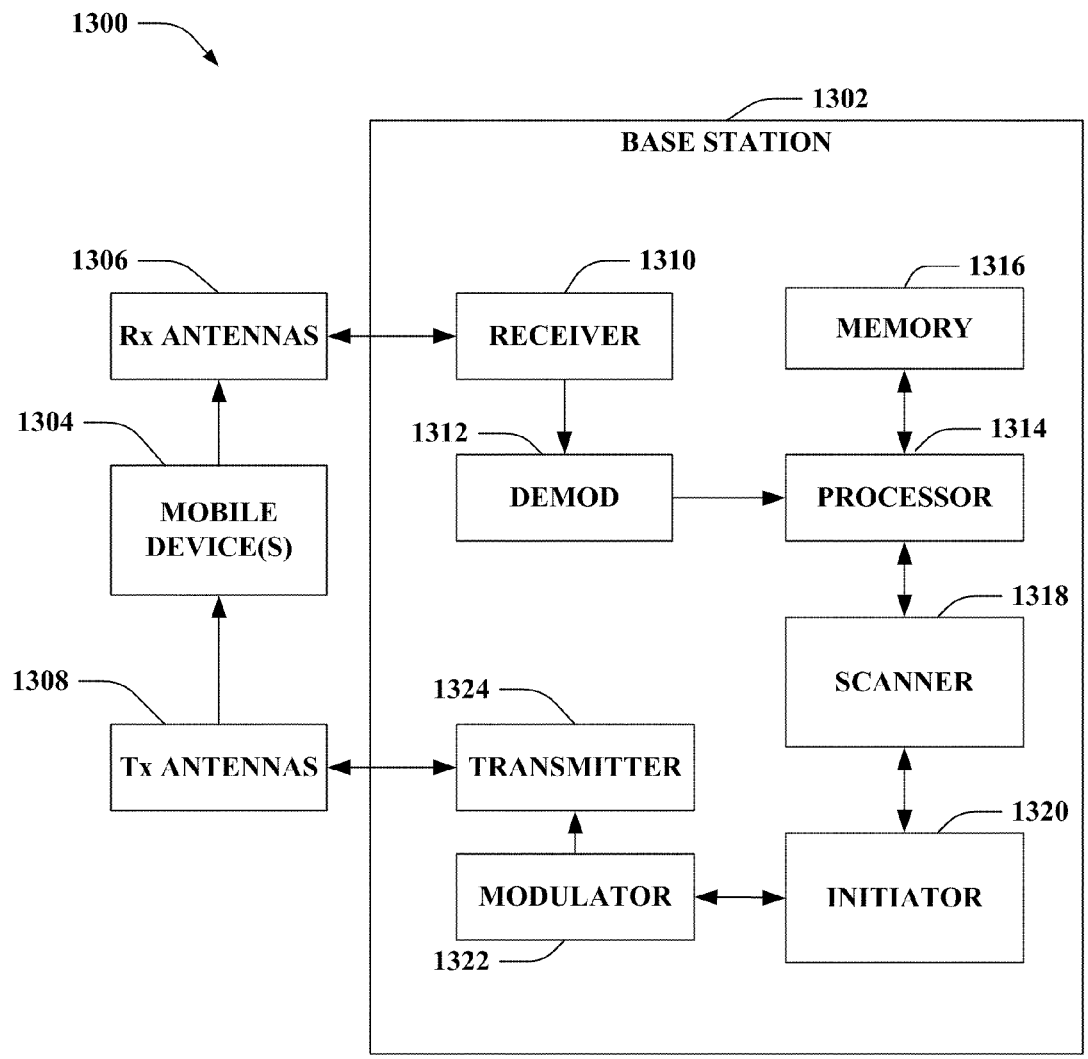
FIG. 13 is an illustration of an example system that facilitates packet communication in accordance with at least one aspect disclosed herein.

FIG. 13 is an illustration of a system 1300 that facilitates processing packets in a communication session. System 1300 comprises a base station 1302 (e.g., access point, . . . ) with a receiver 1310 that receives signal(s) from one or more mobile devices 1304 through a plurality of receive antennas 1306, and a transmitter 1322 that transmits to the one or more mobile devices 1304 through a plurality of transmit antennas 1308. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein.

Processor 1314 is further coupled to a scanner 1318 that determines that a packet is missing from a packet transmission sequence as well as an initiation module 1320 that starts an abort timer upon making the determination (e.g., the length of the abort timer is variable). Information to be transmitted can be provided to a modulator 1322. Modulator 1322 can multiplex the information for transmission by a transmitter 1324 through antenna 1308 to mobile device(s) 1304. Although depicted as being separate from the processor 1314, it is to be appreciated that scanner 1318 and/or initiation module 1320 can be part of processor 1314 or a number of processors (not shown).

Figure 14:
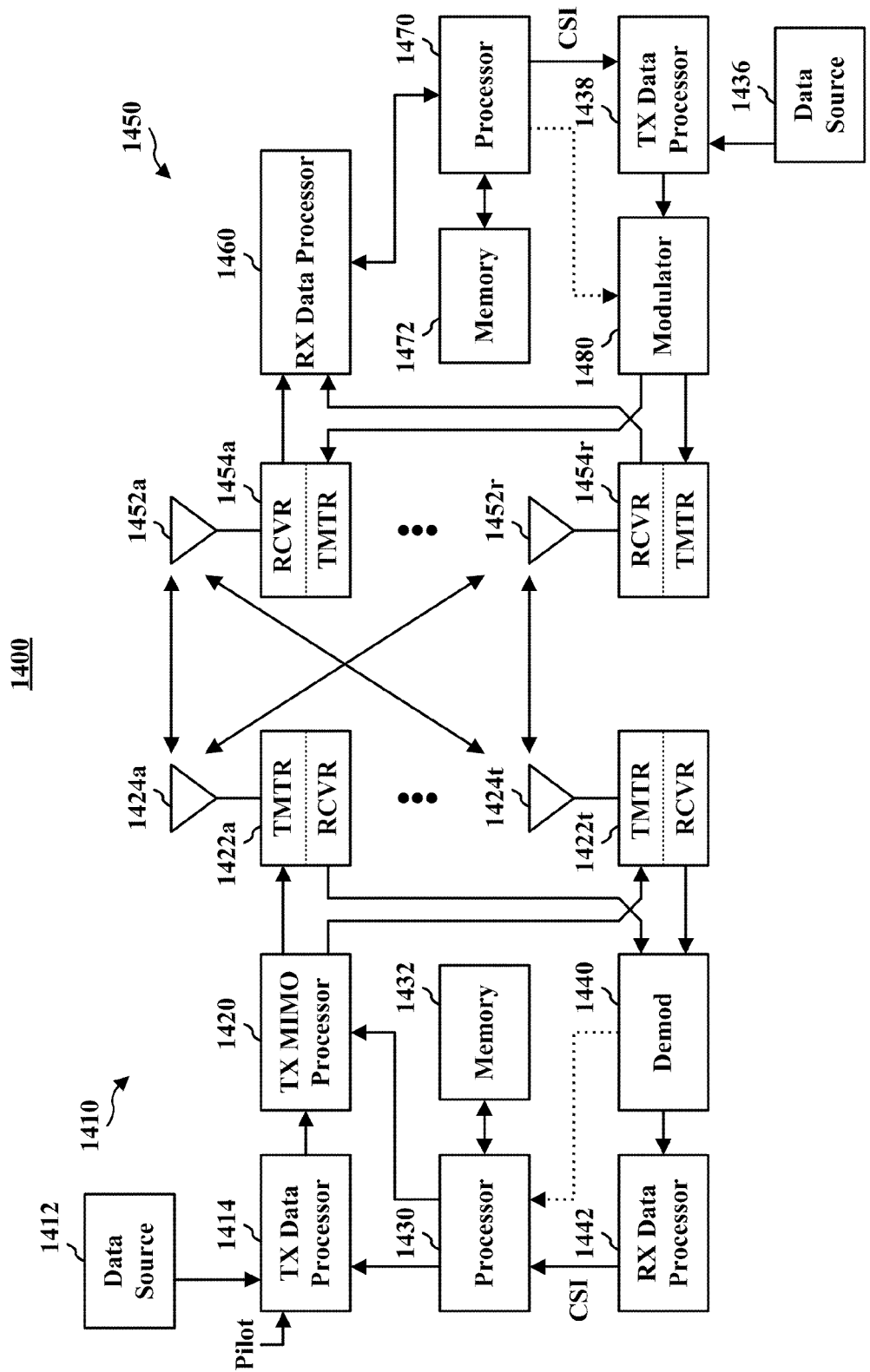
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-8 and 12-13) and/or methods (FIGS. 9-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which preceding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which preceding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
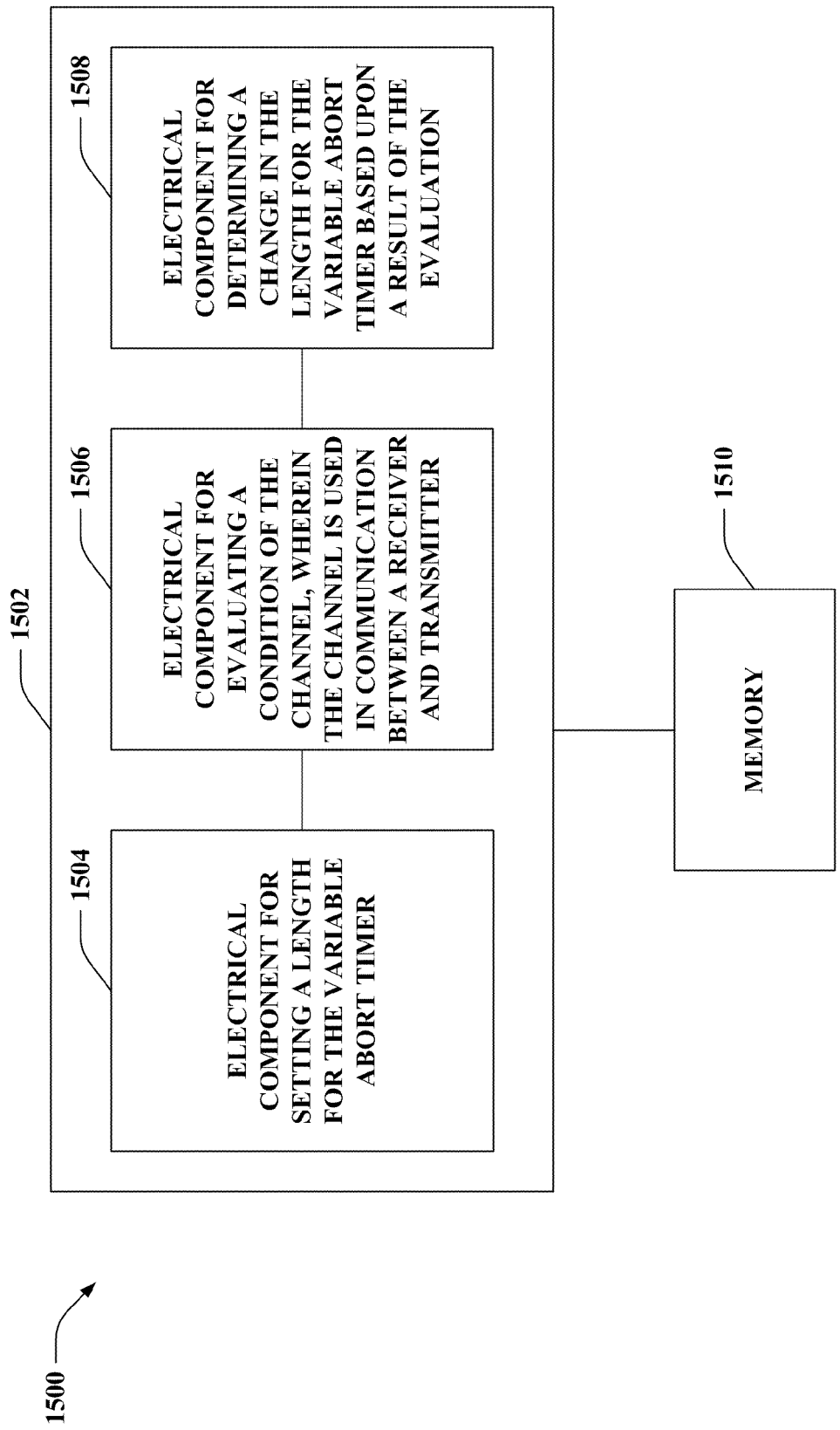
FIG. 15 is an illustration of an example system that uses a variable timer in relation to packet communication in accordance with at least one aspect disclosed herein.

With reference to FIG. 15, illustrated is a system 1500 that effectuates packet communication. For example, system 1500 can reside at least partially within a mobile device. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include electrical component for setting a length for the variable abort timer (e.g., the length defines a time duration to receive a missing data packet communicated on a channel) 1504. Moreover, the logical grouping 1502 can include electrical component for evaluating a condition of the channel (e.g., the channel is used in communication between a receiver and transmitter) 1506 as well as an electrical component for determining a change in the length for the variable abort timer based upon a result of the evaluation 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
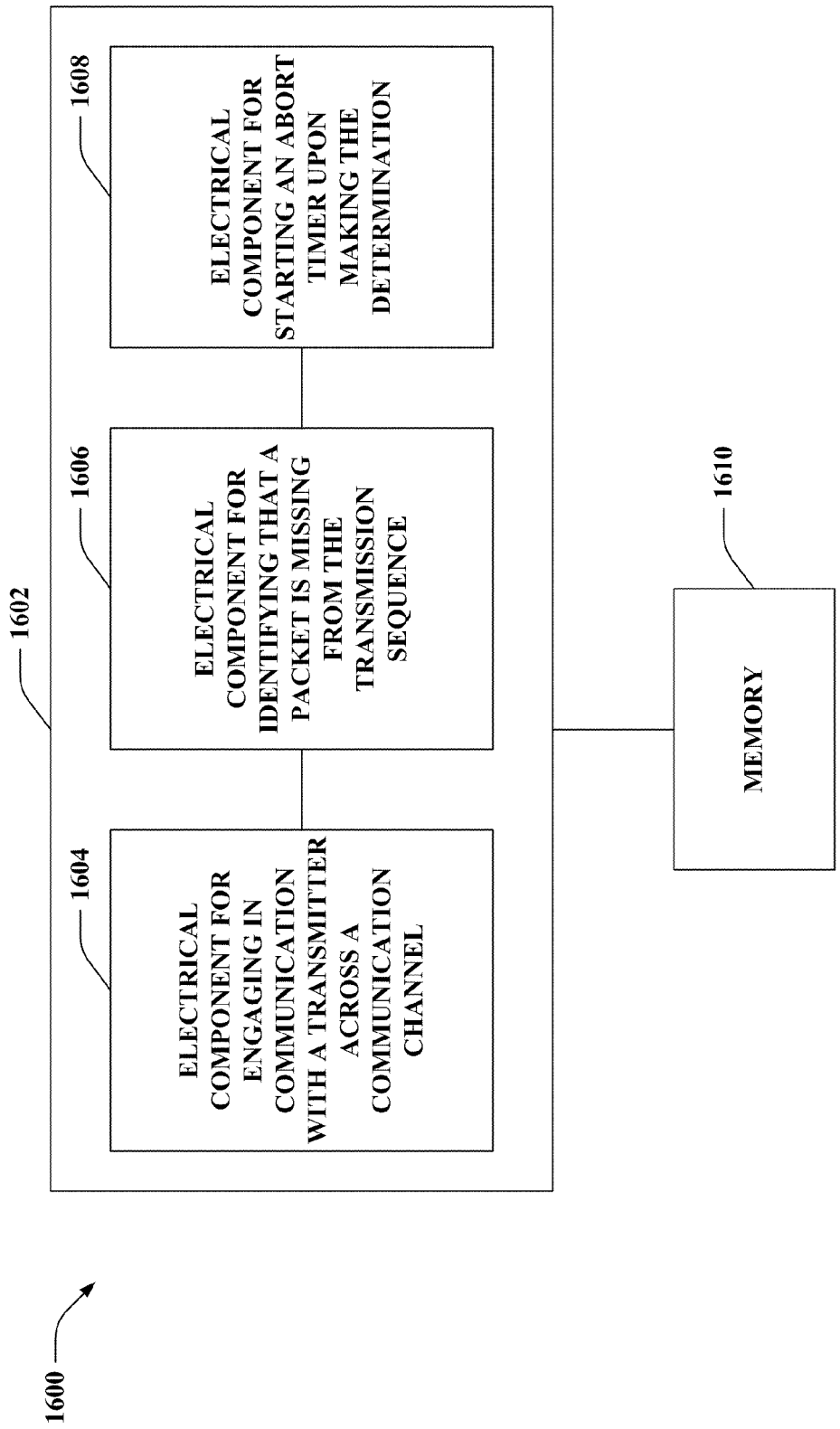
FIG. 16 is an illustration of an example system that facilitates packet collection in accordance with at least one aspect disclosed herein.

Turning to FIG. 16, illustrated is a system 1600 that engages in communication to obtain a packet sequence. System 1600 can reside within a base station, for instance. As depicted, system 1600 includes functional blocks that can represent functions implemented by a processor, software, or combination thereof (e.g., firmware). System 1600 includes a logical grouping 1602 of electrical component. Logical grouping 1602 can include electrical component for engaging in communication with a transmitter across a communication channel (e.g., the communication includes transferring a packet set in a transmission sequence) 1604 in addition to an electrical component for identifying that a packet is missing from the transmission sequence 1606. The logical grouping 1602 can also include an electrical component for starting an abort timer upon making the determination (e.g., a duration of the abort timer is variable based upon a condition of the communication channel and the abort timer duration is a length of time for the missing packet to be collected as part of the transmission sequence) 1610. Additionally, system 1600 can include a memory 1610 that retains instructions for executing functions associated with electrical component 1604, 1606, and 1608. While shown as being external to memory 1610, it is to be understood that electrical component 1604, 1606, and 1608 can exist within memory 1610.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more exemplary embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method executable upon a wireless communication device comprising:
setting a length for a variable abort timer, wherein the length defines a time duration to receive a missing data packet communicated on a channel;
evaluating at least one condition of the channel, wherein the at least one condition of the channel comprises an amount of interference along the channel, and wherein the channel is used in communication between a receiver and a transmitter; and
determining a change in the length for the variable abort timer based upon a result of the evaluation and a storage space characteristic for a buffer, wherein the change decreases the length when the amount of interference along the channel is lower.

2. The method of claim 1, further comprising analyzing the storage space characteristic for the buffer, the storage space characteristic being used in setting the length.

3. The method of claim 1, further comprising:
monitoring communication between the receiver and the transmitter; and
formulating if the length of the variable abort timer is appropriate based upon a result of the monitoring.

4. The method of claim 3, further comprising,
determining a change for the length upon formulating that the length is not appropriate, wherein the determined change is based upon the monitored communication and the result of the evaluation; and
implementing the change.

5. The method of claim 1, further comprising:
collecting a packet of a packet set;
identifying that a packet of the packet set is not collected through series collection of a proceeding packet and a subsequent packet;
beginning the variable abort timer; and
sending a re-transmit request for the packet not collected.

6. An apparatus, comprising:
a modification module that sets a length for a variable abort timer, wherein the length defines a time duration to receive a missing data packet communicated on a channel;
an analysis module that evaluates at least one condition of the channel, wherein the at least one condition of the channel comprises an amount of interference along the channel, and wherein the channel is used in communication between a receiver and a transmitter; and
a calculator that determines a change in the length for the variable abort timer based upon a result of the evaluation and a storage space characteristic for a buffer, wherein the change decreases the length when the amount of interference along the channel is lower.

7. The apparatus of claim 6, further comprising an examination module that analyzes the storage space characteristic for the buffer, the storage space characteristic being used to set the length.

8. The apparatus of claim 6, further comprising:
an observation module that monitors communication between the receiver and the transmitter; and a measurement module that formulates if the length of the variable abort timer is appropriate based upon a result produced by the observation module.

9. The apparatus of claim 8, further comprising,
a recognition module that determines a change for the length upon formulating that the length is not appropriate, wherein the determined change is based upon the monitored communication and the result of the evaluation, wherein the modification module that implements the change.

10. The apparatus of claim 6, further comprising:
an obtainment module that collects a packet of a packet set;
an establishment module that identifies that a packet of the packet set is not collected through series collection of a proceeding packet and a subsequent packet;
a start module that begins the variable abort timer; and
an emitter that sends a re-transmit request for the packet not collected.

11. At least one processor configured to manage a variable abort timer, comprising:
a first module for setting a length for the variable abort timer, wherein the length defines a time duration to receive a missing data packet communicated on a channel;
a second module for evaluating at least one condition of the channel, wherein the at least one condition of the channel comprises an amount of interference along the channel, and wherein the channel is used in communication between a receiver and a transmitter; and
a third module for determining a change in the length for the variable abort timer based upon a result of the evaluation and a storage space characteristic for a buffer, wherein the change decreases the length when the amount of interference along the channel is lower.

12. A computer program product, comprising:
a non-transitory computer-readable medium comprising:
a first set of codes for causing a computer to set a length for a variable abort timer, wherein the length defines a time duration to receive a missing data packet communicated on a channel;
a second set of codes for causing the computer to evaluate at least one condition of the channel, wherein the at least one condition of the channel comprises an amount of interference along the channel, and wherein the channel is used in communication between a receiver and a transmitter; and
a third set of codes for causing the computer to determine a change in the length for the variable abort timer based upon a result of the evaluation and a storage space characteristic for a buffer, wherein the change decreases the length when the amount of interference along the channel is lower.

13. An apparatus, comprising:
means for setting a length for a variable abort timer, wherein the length defines a time duration to receive a missing data packet communicated on a channel;
means for evaluating at least one condition of the channel, wherein the at least one condition of the channel comprises an amount of interference along the channel, and wherein the channel is used in communication between a receiver and a transmitter; and
means for determining a change in the length for the variable abort timer based upon a result of the evaluation and a storage space characteristic for a buffer, wherein the change decreases the length when the amount of interference along the channel is lower.

14. The apparatus of claim 13, further comprising means for analyzing the storage space characteristic for the buffer, the storage space characteristic being used in setting the length.

15. The apparatus of claim 13, further comprising means for monitoring communication between the receiver and the transmitter.

16. The apparatus of claim 15, further comprising means for formulating if the length of the variable abort timer is appropriate based upon a result of the monitoring.

17. The apparatus of claim 16, further comprising means for determining a change for the length upon formulating that the length is not appropriate, wherein the determined change is based upon the monitored communication and the result of the evaluation.

18. The apparatus of claim 17, further comprising means for implementing the change.

19. The apparatus of claim 13, further comprising means for collecting a packet of a packet set.

20. The apparatus of claim 19, further comprising means for identifying that a packet of the packet set is not collected through series collection of a proceeding packet and a subsequent packet.

21. The apparatus of claim 20, further comprising means for beginning the variable abort timer.

22. The apparatus of claim 21, further comprising means for sending a re-transmit request for the packet not collected.

23. A method for packet communication management operable upon a wireless communication device, comprising:
engaging in communication with a transmitter across a communication channel, wherein the communication includes transferring a packet set in a transmission sequence;
identifying that a packet is missing from the transmission sequence; and
starting an abort timer upon making the determination, wherein a duration of the abort timer is variable based upon at least one condition of the communication channel and a storage space characteristic for a buffer, the abort timer duration is a length of time for the missing packet to be collected as part of the transmission sequence, the at least one condition of the communication channel comprises an amount of interference along the channel, and the duration decreases when the amount of interference along the channel is lower.

24. The method of claim 23, further comprising transmitting a request for the missing packet.

25. The method of claim 23, further comprising:
identifying that the abort timer ends; and
continuing operation without the missing packet.

26. The method of claim 25, continuing operation without the missing packet comprises one of:
aborting the transmission sequence; or
processing the transmission sequence without the missing packet.

27. The method of claim 26, further comprising:
evaluating at least a portion of the transmission sequence; and
using a result of the evaluation to determine if aborting or processing of the transmission sequence should occur, wherein the determination made based upon evaluation result.

28. The method of claim 23, further comprising:
evaluating metadata pertaining to the transmission sequence; and
determining if the length should be modified based at least in part on a result of the evaluation.

29. An apparatus, comprising:
an emitter that engages in communication with a transmitter across a communication channel, wherein the communication includes transferring a packet set in a transmission sequence;
a scanner that that identifies that a packet is missing from the transmission sequence; and
an initiation module that starts an abort timer upon making the determination, wherein a duration of the abort timer is variable based upon at least one condition of the communication channel and a storage space characteristic for a buffer, the abort timer duration is a length of time for the missing packet to be collected as part of the transmission sequence, the at least one condition of the communication channel comprises an amount of interference along the channel, and the duration decreases when the amount of interference along the channel is lower.

30. The apparatus of claim 29, the emitter transmits a request for the missing packet.

31. The apparatus of claim 29, further comprising:
a viewer that identifying that the abort timer ends; and
a manager that continues operation without the missing packet.

32. The apparatus of claim 31, continuation of operation without the missing packet comprises one of:
a stop module that aborts the packet transmission sequence; or
a progression module that processes the packet transmission sequence without the missing packet.

33. The apparatus of claim 32, further comprising:
a sequence module that evaluates at least a portion of the packet transmission sequence; and
a measurement module that uses a result of the evaluation to determine if aborting or processing of the packet transmission sequence should occur, wherein the determination is based upon the evaluation result.

34. The method of claim 29, further comprising:
an analysis module that evaluates metadata pertaining transfer of the packet transmission sequence; and
a calculator that determines if the length should be modified based at least in part on a result of the evaluation.

35. At least one processor configured to manage packet communication, comprising:
a first module for engaging in communication with a transmitter across a communication channel, wherein the communication includes transferring a packet set in a transmission sequence;
a second module for identifying that a packet is missing from the transmission sequence; and
a third module starting an abort timer upon making the determination, wherein a duration of the abort timer is variable based upon at least one condition of the communication channel and a storage space characteristic for a buffer, the abort timer duration is a length of time for the missing packet to be collected as part of the transmission sequence, the at least one condition of the communication channel comprises an amount of interference along the channel, and the duration decreases when the amount of interference along the channel is lower.

36. A computer program product, comprising:
a non-transitory computer-readable medium comprising:
a first set of codes for causing a computer to engage in communication with a transmitter across a communication channel, wherein the communication includes transferring a packet set in a transmission sequence;
a second set of codes for causing the computer to identify that a packet is missing from the transmission sequence; and
a third set of codes for causing the computer to start an abort timer upon making the determination, wherein a duration of the abort timer is variable based upon at least one condition of the communication channel and a storage space characteristic for a buffer, the abort timer duration is a length of time for the missing packet to be collected as part of the transmission sequence, the at least one condition of the communication channel comprises an amount of interference along the channel, and the duration decreases when the amount of interference along the channel is lower.

37. An apparatus, comprising:
means for engaging in communication with a transmitter across a communication channel, wherein the communication includes transferring a packet set in a transmission sequence;
means for identifying that a packet is missing from the transmission sequence; and
means for starting an abort timer upon making the determination, wherein a duration of the abort timer is variable based upon at least one condition of the communication channel and a storage space characteristic for a buffer, the abort timer duration is a length of time for the missing packet to be collected as part of the transmission sequence, and the at least one condition of the communication channel comprises an amount of interference along the channel, and the duration decreases when the amount of interference along the channel is lower.

38. The apparatus of claim 37, further comprising means for transmitting a request for the missing packet.

39. The apparatus of claim 37, further comprising means for identifying that the abort timer ends.

40. The apparatus of claim 39, further comprising means for continuing operation without the missing packet.

41. The apparatus of claim 40, wherein the means for continuing operation without the missing packet comprises means for aborting the transmission sequence.

42. The apparatus of claim 41, further comprising means for evaluating at least a portion of the transmission sequence.

43. The apparatus of claim 42, further comprising means for using a result of the evaluation to determine if aborting the transmission sequence should occur, wherein the determination is made based upon evaluation result.

44. The apparatus of claim 40, wherein the means for continuing operation without the missing packet comprises means for processing the transmission sequence without the missing packet.

45. The apparatus of claim 44, further comprising means for evaluating at least a portion of the transmission sequence.

46. The apparatus of claim 45, further comprising means for using a result of the evaluation to determine if processing of the transmission sequence should occur, wherein the determination is made based upon evaluation result.

47. The apparatus of claim 37, further comprising means for evaluating metadata pertaining to the transmission sequence.

48. The apparatus of claim 47, further comprising means for determining if the length should be modified based at least in part on a result of the evaluation.

* * * * *